(12) United States Patent
Winkelmann et al.

(10) Patent No.: US 12,436,826 B2
(45) Date of Patent: Oct. 7, 2025

(54) METHOD FOR GENERATING AND EXECUTING A DATA PROCESSING PIPELINE

(71) Applicant: Siemens Healthineers AG, Forchheim (DE)

(72) Inventors: Sven Winkelmann, Nuremberg (DE); Michael Kelm, Erlangen (DE); Johann Pongratz, Lahntal (DE); Mikhail Limmer, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 21 days.

(21) Appl. No.: 18/476,526

(22) Filed: Sep. 28, 2023

(65) Prior Publication Data

US 2024/0111613 A1     Apr. 4, 2024

(30) Foreign Application Priority Data

Sep. 29, 2022 (DE) ..................... 10 2022 210 351.3

(51) Int. Cl.
*G06F 9/54* (2006.01)
*G06F 21/57* (2013.01)

(52) U.S. Cl.
CPC ............ *G06F 9/544* (2013.01); *G06F 21/577* (2013.01)

(58) Field of Classification Search
None
See application file for complete search history.

(56) References Cited

U.S. PATENT DOCUMENTS

2023/0010019 A1* 1/2023 Muthuswamy .. G06Q 10/06393

OTHER PUBLICATIONS

Kubeflow "The Machine Learning Toolkit for Kubernetes"; 5] https://www.kubeflow.org/ [Online Sep. 21, 2022).
Orion Innovation "Orion Pseudonymization Tool", https://www.orioninc.com/products/pseudonymization-tool/ [Online Sep. 21, 2022].
"Power Automate" https://powerautomate.microsoft.com/de-de/ [Online Sep. 21, 2022]; and English translation thereof.
Caristix "De-Identify HL7 Sensitive Data and Protect PHI", https://caristix.com/complete-and-specialized-hl7-fhir-solutions/cloak-desktop-live/ [Online Sep. 21, 2022).
Apache Airfllow "Airflow is a platform created by the community to programmatically author, schedule and monitor workflows"; https://airflow.apache.org/ [Online Sep. 21, 2022].

(Continued)

*Primary Examiner* — Scott C Sun
(74) *Attorney, Agent, or Firm* — Harness, Dickey & Pierce, P.L.C.

(57) ABSTRACT

One or more example embodiments of the present invention relates to a method for generating a data processing pipeline for a cloud computing system, wherein the data processing pipeline comprises at least one software module for execution in at least one execution environment, wherein the execution environment has allocated execution environment information data. The method includes receiving at least one software module selection of a user, receiving at least one input data selection of a user, receiving at least one user planning input, checking a compliance with at least one of data protection requirements or technical requirements of the data processing pipeline, which is to be generated.

21 Claims, 4 Drawing Sheets

(56) References Cited

OTHER PUBLICATIONS

"syngo.via VB60A", DICOM Conformance Statement; https://cdn0.scrvt.com/39b415fb07de4d9656c7b516d8e2d907/6c2ec855974ae4f1/0b62fb04ba87/DCS_syngo_via_VB60A.pdf.

Apeer com "Automated Image Analysisscalable solution for reproducible results"; https://apeer.com/; Download Sep. 21, 2022.

Veil ai.:"solutions enabling better use of health data for research, development and innovation", https://veil.ai/ Download Sep. 21, 2022.

Mabotuwana et al; An HL7 Data Pseudonymization Pipeline; International Conference on Healthcare Informatics; 978-1-4673-9548-9/15 $31.00 © 2015 IEEE; DOI 10.1109/ICHI.2015.43.

* cited by examiner

METHOD FOR GENERATING AND EXECUTING A DATA PROCESSING PIPELINE

CROSS-REFERENCE TO RELATED APPLICATION(S)

The present application claims priority under 35 U.S.C. § 119 to German Patent Application No. 10 2022 210 351.3, filed Sep. 29, 2022, the entire contents of which are incorporated herein by reference.

FIELD

One or more example embodiments of the present invention relates to a method, in particular computer-implemented method, for generating a data processing pipeline for a cloud computing system, wherein the data processing pipeline comprises at least one software module. One or more example embodiments of the present invention further relates to a data processing pipeline, a method for executing the data processing pipeline, a system, and a computer program product.

RELATED ART

Medical facilities such as for example hospitals, increasingly use cloud-based software solutions. In order to implement complex tasks, such as diagnosing and/or evaluating image data, data processing pipelines are used that can comprise a plurality of software modules that are executed on various system elements of a cloud computing system. These software solutions require a data technical connection between the participant system elements. The exchange of data, in particular of medical data, is subject to strict data protection requirements that are also to be complied with by data processing pipelines of this type. In particular, country-specific data protection regulations apply in different countries and/or different data protection regulations apply for different data. In order to exchange the data, this data is therefore processed beforehand by data minimization, for example anonymization or pseudonymization. In this case, it is not ensured that the data-minimized data can be further processed by the software modules.

Data, algorithms and learning models are necessary for clinical decision support. Increasingly, data processing pipelines (workflows) are emerging that inter alia connect data from various systems, pre-process (heterogeneous) data and calculate the corresponding information via diverse algorithms and models. Often dependencies exist in this case, such as for example a data set must first be converted into a corresponding format, must be processed using an algorithm in order to finally be concluded using a model. The end-to-end workflow of data from various system elements, for example various clinical systems or clinic and cloud, to the result of an algorithm or model increasingly requires multiple transmission steps and often manual labor in order to cover data protection and hardware requirements.

Formerly, data processing pipelines have been manually programmed by software developers for each case, wherein thorough knowledge both in programming as well as in the process or workflow, which is to be automated, data protection and the participant systems are required.

The minimization of data frequently occurs due to anonymization or pseudonymization. In the scientific field, for example methods for pseudonymization and re-identification of HL7 messages are known. Moreover, commercial applications are on the market, such as for example: SHS teamplay Receiver & Image Hub (pseudonymization of DICOM data on the basis of privacy profiles prior to transmission into the Cloud) and SHS Syngo.VIA (pseudonymized DICOM export). What they all have in common is a fixed set of (learned) rules in order to minimize data in a uniform manner.

SUMMARY

One or more example embodiments of the present invention renders possible a simplified generation and/or execution of data processing pipelines, wherein the data processing pipelines that are generated and/or executed in this manner ensure the data protection and fulfil the technical requirements of the participant software modules and execution environments.

This object is achieved by a subject matter as claimed in the independent claim. Advantageous embodiments are the subject matter of the dependent claims, the description and the drawings.

BRIEF DESCRIPTION OF THE DRAWINGS

Advantages, effects and embodiments are provided in the attached figures and the description. In the drawings.

DETAILED DESCRIPTION

Figure 1:
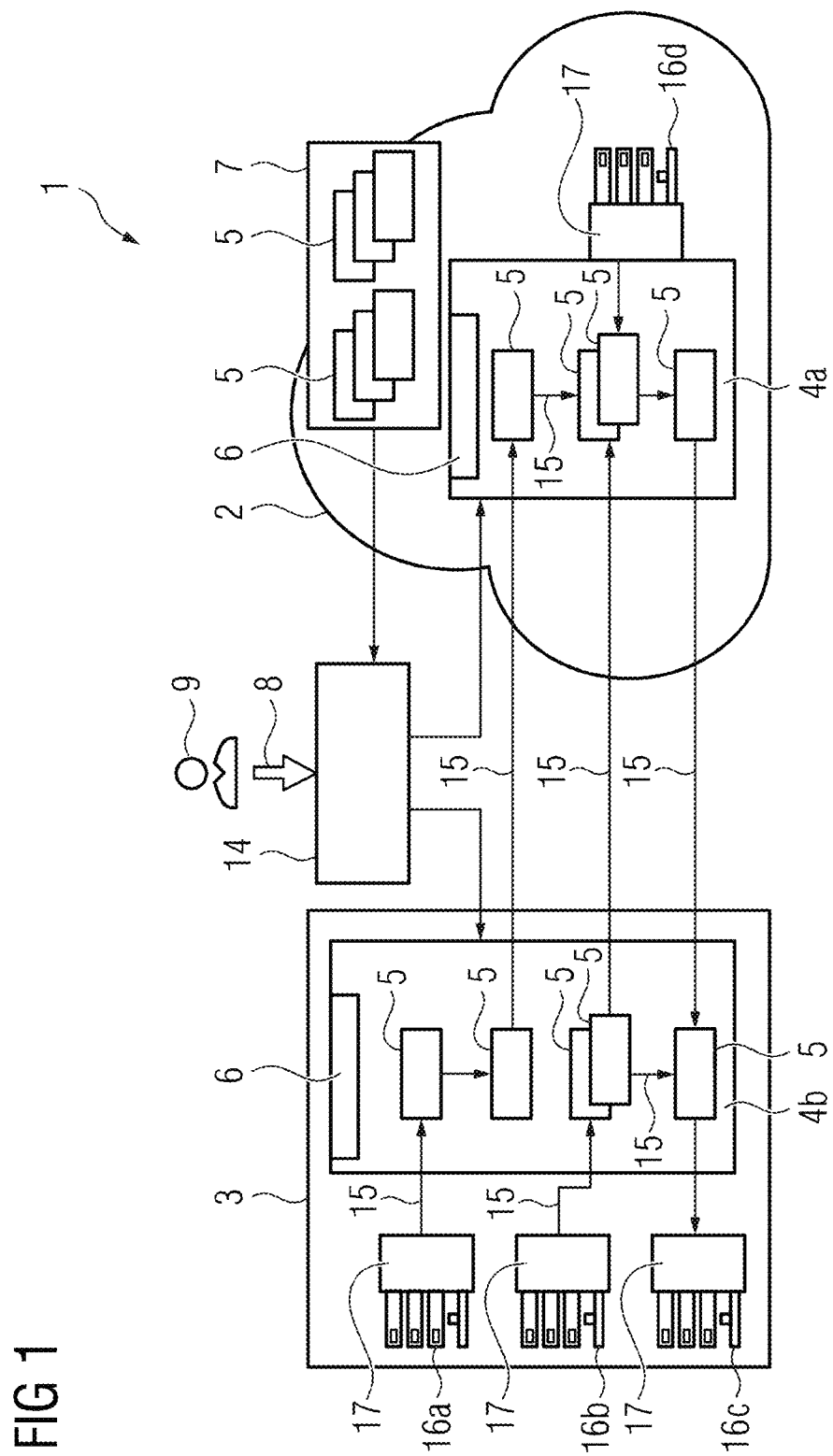
FIG. 1 shows a cloud computing system in an exemplary manner.

In accordance with one or more example embodiments of the present invention, a method is proposed for generating a data processing pipeline for a cloud computing system. The data processing pipeline comprises at least one software module for the execution in at least one execution environment, wherein the execution environment has allocated execution environment information data. The method comprising the steps:

Receiving at least one software module selection of a user for the data processing pipeline that is to be generated, wherein the software module selection comprises a selection of at least one software module from a module source, wherein the software modules have in each case allocated module requirement data, Receiving at least one input data selection of a user for the data processing pipeline that is to be generated, wherein the input data selection comprises a selection of input data for the data processing pipeline that is to be generated, wherein the input data has in each case allocated data contract data.

Receiving at least one user planning input, wherein the user planning input comprises a description of an architecture of the data processing pipeline that is to be generated, a data technical connection between the software modules of the data processing pipeline that is to be generated and/or a distribution of the selected software modules to execution environments, Checking a compliance with data protection requirements and/or technical requirements of the data processing pipeline, which is to be generated, based on the data contract data of the selected input data, the module requirement data of the selected software modules, the user planning input and/or the execution environment information data, wherein test information is determined based on the checking, generating the data processing pipeline based on the selected input data, the selected software modules and the user planning input Providing the generated data processing pipeline and/or the determined test information.

In particular, producing the data processing pipeline is understood as generating a data processing pipeline. The generation and/or production of the data processing pipeline is designed for example as generating and/or producing the data processing pipeline in the form of a data packet, a file and/or program that can be executed or the data processing pipeline is included in the program. The data packet forms for example an installation packet for execution on a computer, in particular the cloud computing system, wherein the execution of the installation packet leads to an implementation of the data processing pipeline in the computer or the cloud computing system. The file is for example an executable file, in particular executable by the computer or the cloud computing system, wherein the execution of the file preferably leads to an execution and/or application of the data processing pipeline on the computer or the cloud computing system. The executable program is designed for execution on a computer and/or the cloud computing system, the executable computer program, the file and/or the data packet can be stored or is stored on a machine-readable storage medium.

The cloud computing system preferably comprises at least one cloud. The cloud is designed so as to store data, for example provided by external system elements. Moreover, the cloud is designed so as to execute and/or apply algorithms, applications and/or data processing, in particular in the form of software modules. For example, applications, algorithms and/or software modules are outsourced to the cloud and/or are provided for the application that can be used by external system elements on account of high system requirements. The cloud computing system comprises at least one system element, in particular an external system element, wherein the external system element is also named client. The system element can be designed as a local computer that is connected to the cloud, a computer network and/or a facility (for example hospital or practice). The system elements can be interconnected and/or the system elements can be connected and/or can be connectible to the cloud in a data technical manner. For example, a hospital can use as a system element or client the applications that are executable and/or provided on the cloud for the evaluation of its own or locally stored data. It is particularly preferred that the cloud computing system is designed as a network from a plurality of system elements (computers, local networks, facilities) and at least one cloud.

The data processing pipeline is designed for the execution and/or application by the cloud computing system and/or a computer. The data processing pipeline, also called workflow, is designed so as to process and/or evaluate data, in particular input data, wherein output data is produced. The data processing pipeline maps in particular data processing comprising a plurality of processing steps.

The data processing pipeline comprises at least one software module, preferably at least two and in particular at least ten software modules. The software module is designed for execution in an execution environment. In particular, the software module is designed for execution and/or application by the cloud or the system elements. The software module maps in other words in particular a computer program, an algorithm or process. The software module can be designed so as to implement a processing step of the data processing that is mapped by the data processing pipeline. The software modules of a data processing pipeline are interconnected in a data technical manner. The software modules of a data processing pipeline can be arranged and/or provided in parallel with the result that a simultaneous and/or parallel data processing is performed due to the parallel software modules. Alternatively and/or in addition, the software modules of a data processing pipeline can be arranged and/or connected serially, wherein the data processing is performed serially and/or consecutively. The data processing pipeline in other words describes in particular an architecture, arrangement and/or connection of software modules, wherein output data of a software module can be used as input data of another software module.

In particular, the cloud, system elements, computer and/or data processing facilities are understood as execution environments. Alternatively and/or in addition, the cloud, the system elements, computer and/or data processing facilities comprise an execution environment. For example, the cloud forms and/or comprises a first execution environment that is designed in particular so as to execute complex software modules and/or software modules with high system requirements. The system elements, in particular the facilities (hospitals and/or practices) form further execution environments that are designed so as to provide data, in particular input data, and frequently have a low system capacity. The execution environments in each case comprise allocated execution environment information data, in particular in the form of a data set. The execution environment information data is in particular machine-readable, in particular data that is readable by cloud computing system. The execution environment information data forms and/or comprises preferably a description of technical and/or data protection characteristics of the execution environment. For example, the execution environment information data comprises a geolocation, an encryption, firewall and/or capacity of the execution environment.

The step of receiving at least one software module selection is based in particular on a user input, in particular in the form of a user selection. The user makes the user selection and/or performs the user input for example via a human machine interface (HMI). The human machine interface is designed for example for the optical and/or graphical selection, input and/or specification of the user input and/or the user selection. For example, via the human machine interface the user can display selectable software modules, for example the software modules of a module source, and can select from the displayed software modules, for example by marking, clicking or drag and drop. In particular, due to the human machine interface it is possible for the user to perform a search, for example text-based, for software modules with the result that the user can select from the search results. For example, the user can search for functions and/or tasks that form the known or fundamental processing steps of the data processing, wherein software modules, which can implement the searched functions or tasks, are displayed and can be selected as the search result. In particular, a selection of multiple software modules is possible via a software module selection. The module source is designed for example as an app store or storage locations of software modules. In particular, the cloud and/or the system elements can obtain software modules from the module source. For example, the software modules are provided to the cloud computing system by the module source, for example for download and/or as installation packets.

The software modules in each case comprise allocated module requirement data. The module requirement data forms machine-readable, in particular computer-readable data, for example in the form of a data set. The module requirement data can be included in the respective software module as meta data. Alternatively, the module requirement data can be stored, deposited and/or can be retrievable centrally, for example in the cloud or the module source. The module requirement data comprises for example information in relation to technical requirements of the respective software module, for example required resources, capacity, execution environments, input data and/or components. The module requirement data can moreover include information regarding which input data is required, which interfaces the software module has and/or requires for module input data and/or module output data. In particular, the module requirement data comprises information regarding the format, size, file format and/or requirements that are required for the input data and/or module input data. Moreover, the module requirement data can comprise information regarding the ensured data protection of the software module.

The step of receiving at least one input data selection is based in particular on a user input, in particular in the form of a user selection. The user makes the user selection and/or performs the user input for example via a human machine interface (HMI). The input data selection in this case is provided for example by the human machine interface. The human machine interface can be the same as the human machine interface for inputting, providing and/or selecting the software module selection and/or the user planning input. The human machine interface is designed for example for the optical and/or graphical selection, input and/or specification of the user input and/or the user selection. For example, via the human machine interface the user can display selectable possible and/or available input data and/or data sources, and can select from the displayed input data and/or data sources, for example by marking, clicking or drag and drop. In particular, due to the human machine interface it is possible for the user to perform a search, for example text-based, for input data and/or data sources with the result that the user can select from the search results. For example, the user can search for functions and/or tasks that form the known or fundamental processing steps of the data processing, wherein input data and/or data sources that are required for or can be processed for the searched functions or tasks are displayed and can be selected as the search result. In particular, a selection of multiple items of input data and/or data sources is possible via an input data selection. The input data is provided for example by a system element, client, the cloud and/or facility. The input data comprises and/or forms in particular medical data, patient data and/or medical imaging data. The input data comprises and/or forms in particular data that is subject to data protection and/or is not freely accessible or must be processed, transmitted and/or stored in a protected manner. A data source is in particular designed so as to provide input data. For example, the cloud, the system elements, data storage devices, facilities and/or clients form a data source.

The input data, module input data and/or module output data comprises in each case allocated data contract data. The data contract data forms machine-readable, in particular computer readable data, for example in the form of a data set. The data contract data can be included in the respective input data, module input data and/or module output data as meta data. Alternatively, the data contract data can be stored, deposited and/or can be retrievable centrally, for example in the cloud or the data source. The data contract data comprises for example information in relation to data protection, the safety level and/or content. In particular, the data contract data forms or comprises a machine-readable classification of the associated data (input data, module input data, module output data). For example, the input data, module input data and/or module output data comprises personalized and/or sensitive data, wherein the associated data contract data information with regard to the identification of the sensitive and/or personalized data in the associated data. Moreover, the data contract data can information with regard to legal requirements in relation to the disclosure of data and/or required minimization, encryption, pseudonymization, anonymization, admissible countries, software modules and/or evaluations. In particular, the data contract data comprises information with regard to a data controller, a data origin, a legal basis (for example collaboration contract), citation requirements, included sensitive data, data disclosure rules (for example admissible third countries), access authorizations and/or retention periods.

The step of receiving at least one user planning input is based in particular on a user input, in particular in the form of a user selection. The user input comprises for example the graphical input of an architecture of the data processing pipeline, the connection and/or arrangement software modules. The user makes the user selection and/or performs the user input for example via a human machine interface (HMI). The user planning input in this case is provided for example by the human machine interface. The human machine interface is designed for example for the optical and/or graphical selection, input and/or specification of the architecture, connections, arrangement of the software modules and/or the user input. For example, it is possible via the human machine interface for the user to display the selected software modules and/or selected input data, module input data and/or module output data of the data processing pipeline that is to be generated, wherein via the human machine interface the user can arrange and/or connect the software modules corresponding to their concept, in particular can specify and/or define data technical connections between the software modules and/or execution environments. For example, a plan and/or an architecture of the data processing pipeline is provided by the user, wherein the plan and/or the architecture comprises and/or describes an arrangement of the software modules, data technical connections between the software modules, allocations of software modules to execution environments and/or a data flow.

The step of checking compliance with data protection requirements and/or technical requirements, referred to in short below as the checking step, is performed in particular in a computer implemented manner. Moreover, the checking step is performed in particular automatically and/or in an automated manner. The checking step can also be understood as a validation of the conformity in relation to the data protection and/or technical requirements. The checking step is designed in other words to check whether a data processing pipeline comprising the selected software modules and input data can be performed taking into consideration the user planning input, in particular by the cloud computing system, or whether technical requirements such as execution environments and/or capacity cannot be met. Moreover, the checking step can be designed so as to check and/or to determine whether a data processing pipeline comprising the selected software modules and input data and also taking into consideration the user planning inputs complies with data protection, in particular the data protection that is required for the input data, module input data, module output data and/or interim results. The check is performed based on the data contract data of the selected input data, module input data and output data of the included software modules, the module requirement data of the selected software modules, the execution environment information data and/or the user planning input. For example, the check comprises a comparison and/or matching of the data contract data with the execution environment information data and/or the module requirement data. Alternatively and/or in addition, the check comprises a comparison and/or matching of the module requirement data with the execution information data, the user planning input and/or the data contract data. Test information is determined as a result of the step. The test information is machine-readable information. The test information comprises in particular a result for whether the data protection requirements and/or technical requirements of the data processing pipeline, which is to be generated, are complied with or not. For example, the test information comprises a result as to whether the data protection requirements are complied with and a result as to whether the technical requirements are complied with. In addition, the test information in the event of non-compliance with data protection requirements and/or technical requirements can comprise test information meta data, wherein the test information meta data can comprise information with regard to the non-compliance, for example why this is not complied with and/or from which software module or data the non-compliance originates. The check can be based in particular on an algorithm of machine learning, a neural network and/or deep learning.

The step of generating the data processing pipeline is performed in particular in a computer implemented and/or automatic manner. The generation comprises for example producing the data processing pipeline in machine-readable form, for example as a data set or file. The generation of the data processing pipeline is based on the selected software modules, the selected input data, the user planning input, the module input data, the module output data and/or the test information. In particular, the generation is designed as a generation of the data processing pipeline corresponding to and/or leaning on the architecture, arrangement and/or connections of the user planning input.

In the step of providing the generated data processing pipeline and/or the determined test information, the data processing pipeline and/or the test information is provided to the user and/or the cloud computing system, in particular provided and/or displayed in a data technical manner. For example, the generated data processing pipeline is provided to the cloud computing system, a control module, a client, the cloud or the user as data or a data packet, in particular for the installation and/or execution of the data processing pipeline by the cloud computing system. The determined test information can additionally be output to the generated data processing pipeline. Alternatively, the test information can be output if it has not been possible to comply with the data protection requirements and/or technical requirements and/or it has not been possible to generate a data processing pipeline. In this case, the test information that is output can be understood as an indicator for the fact that a data processing pipeline has not been generated and/or provide justification for this.

One or more example embodiments of the present invention renders it possible for non-programmers and/or for users that have little to no experience with data protection templates and/or technical requirements to also generate a data processing pipeline.

The classification of each data set (input data, module input data, module output data) via machine-readable data contract data, the classification of the technical requirements of the software modules in machine-readable module requirement data and the classification of the execution environments in execution environment information data renders possible a simpler automated processing and simpler generation. The processing of the user inputs and the check that is based thereon renders possible automation in the creation of a data processing pipeline. In particular, one or more example embodiments of the present invention renders possible an abstraction of technical and data protection relevant aspects with the result that non-technically oriented system operators have the possibility of building a hybrid data processing pipeline.

In accordance with one or more example embodiments of the present invention, it is provided that based on the test information in the event of non-compliance with the data protection requirements and/or the technical requirements at least one possible and/or required software module for the fulfilment is determined, wherein the at least one determined possible and/or required software module is provided to the user as a module proposal for integration into the data processing pipeline that is to be generated. In other words, it is provided that based on the step of checking the compliance with the data protection requirements and/or the technical requirements in the event of determining a non-compliance at least one software module is determined and/or specified that ensures, renders possible and/or is required for the fulfilment of the compliance with the data protection requirements and/or the technical requirements. For example, the test information comprises information that provides information regarding whether the data protection requirements and/or the technical requirements are fulfilled or not, in particular a reason for the non-fulfilment and/or non-compliance. Based on this information and/or the test information at least one software module is automatically searched for that is required and/or can be used in order to fulfil the data protection requirements and/or to fulfil the technical requirements even in the case of the existing architecture, data technical connections and/or selected software modules. In other words, it is provided here to automatically, in particular in a computer-implemented manner and/or based on algorithms of machine learning, deep learning or neural networks to automatically determine software modules that are required and/or can be used. It is thus possible for an original non-compliance of a generated data processing pipeline to actually fulfil the data protection requirements and/or technical requirements by adding the software modules that are specified in this way. The software module that is determined in this manner is provided as a module proposal for integration into the data processing pipeline that is to be generated.

For example, the module proposal is provided displayed to the user, in particular for selection via the human machine interface. The user can then decide whether they would like to add the one or multiple proposed software modules of the module proposal into the data processing pipeline that is to be generated, with the result that the data protection and/or technical requirements are fulfilled.

Optionally, it is provided that based on the test information in the event of non-compliance with the data protection requirements and/or the technical requirements at least one software module that is possible and/or required for the fulfilment is determined, wherein in the step of generating the data processing pipeline the data processing pipeline is generated based on the selected input data, the selected software modules, the user planning inputs and the at least one determined possible and/or required software module. In this case, it is preferably provided that in the step of generating the data processing pipeline, the data processing pipeline is generated based on the selected input data, the selected software modules, the user planning inputs and also the at least one determined possible and/or required software module. In other words, this embodiment is designed in addition to the selection and determinations made by the user to supplement and/or to add the one or multiple software modules that are required in order to comply with the data protection requirements and/or technical requirements. In other words, it is automatically determined what is required in order to create a data processing pipeline that is admissible in terms of data protection law and/or that is sufficient for the technical requirements, and is automatically added. In particular, it is provided that in the step of generating the data processing pipeline the determined possible and/or required software modules are to be arranged and/or placed in the architecture and/or the data technical connections so that these software modules fulfil their purpose. In this regard, the required and/or determined software modules comprise for example meta data and/or the arrangement, data technical connection is performed based on the test information and/or the meta data that the software modules comprise. The addition during generation is preferably based on algorithms and/or methods of machine learning, the plans and/or neural networks.

One embodiment of the invention provides that the software modules in each case comprise at least one input interface for the acquisition of module input data and at least one output interface for the acquisition of module output data, wherein the module input data and/or the module output data have allocated data contract data, wherein in the step of checking a compliance with data protection requirements and/or technical requirements a check is performed as to whether the data protection requirements are fulfilled based on a comparison of the data contract data of the module output data and/or the module input data with the module requirement data of the further selected software modules, with the user planning inputs and/or with the execution environment information data.

It is particularly preferred that the software modules in each case comprise at least one input interface for acquiring module input data, for example in the form of the input data. Moreover, the software modules comprise at least one output interface for the transfer and/or output of module output data. The module output data can be provided in particular to a subsequent and/or further software module as input data or module input data. The module output data forms processed, analyzed and/or edited module input data, in particular due to the software module. The input interfaces and the output interfaces are also called interfaces for short. The input interface and/or the output interface are in particular virtual interfaces or interfaces of a software module. The module input data and/or the module output data are assigned data contract data and/or have such data. In particular, the software module is designed so as to assign data contract data to its module output data and/or to provide and/or to store this data contract data. The module output data and/or the module input data comprise for example sensitive data, patient information and/or data that is to be protected, wherein the data contract data has information regarding which of the included data is to be protected, the type of the encryption, data protection requirements and/or which authorizations a receiver must have.

It is preferred that in the step of checking a compliance with data protection requirements and/or technical requirements it is provided that the fulfilment of the data protection requirements is based on a comparison of the data contract data of the module input data with the module requirement data of the software module that is acquiring as module input data. Moreover, it can be provided that the step of checking is based on a comparison of the data contract data of the module input data and/or the module output data with the user planning task and/or with the execution environment information data. For example, the data contract data of the module output data comprises information that specific data that is included therein can only be provided in an anonymized manner to a third party, for example cloud, with the result that the comparison of the data contract states of this software module with the execution environment information data of the cloud results in a lack of fulfilment.

In particular, it is provided that a software module having minimal data processing, minimal data minimization, minimal anonymization and/or minimal pseudonymization of the input data and/or module input data is determined as the possible and/or required software module for the fulfilment. For example, a plurality of software modules are suitable and/or can be obtained from the module source as the possible and/or required software module, wherein in accordance with this embodiment from the suitable software modules, the software module that is selected only minimally processes, minimizes, anonymizes and/or pseudonymizes the input data and/or module input data, which is to be processed by the software module, or less in comparison with the other suitable software modules. This embodiment renders it possible to generate particularly lean, resource preserving and efficient data processing pipelines.

One embodiment of the invention provides that in the step of checking a compliance with data protection requirements and/or technical requirements in each case a fulfilment of technical requirements of the software modules of the data processing pipeline, which is to be generated, is checked in relation to an execution of the respective software module in the data processing pipeline, for an execution of the software module in combination with the further software modules, in particular the preceding and/or subsequent software modules along a data processing path and/or for an execution of the software module in the execution environment. In particular, in this case in the step of checking a compliance with data protection requirements and/or technical requirements a comparison is determined of the module requirement data of the respective software module with the execution environment information data, in particular the execution environment in which they are to be executed according to the user planning input and/or architecture, and/or with the software module requirement data of the further software modules, in particular preceding and/or subsequent software modules. Based on the comparison, the compliance or non-compliance with the data protection requirements and/or technical requirements is checked and/or determined. For example, it is determined for a software module that this cannot be executed in the planned execution environment since the execution environment does not have sufficient capacity, wherein this is determined based on the comparison of the module requirement data with the execution information data. Based on this comparison, it is then determined that the technical requirements for this software module or the data processing pipeline that is to be generated are not complied with. In particular, it is provided that in the step of checking a compliance with data protection requirements and/or technical requirements a fulfilment of the data protection requirements is based on a comparison of the data contract data of the input data and/or the module input data or module output data with the module requirement data of the selected software modules and/or the software modules that this data is provided to. Moreover, the comparison can be based on a comparison of the data contract data with the user planning inputs and/or the execution environment information data. For example, the input data and/or module output data that are provided as module input data for a software module that is executed on the cloud is not permitted for processing outside of a state or a facility with the result that it is determined by the comparison of the data contract data with the execution environment information data of the cloud that the data protection requirements in this case are not complied with.

In particular, it is provided that in the step of generating the data processing pipeline a hybrid data processing pipeline is generated and/or produced. The execution of the software modules, which are included in the data processing pipeline, in at least two different execution environments is understood as a hybrid data processing pipeline. For example, the hybrid data processing pipeline provides that the software modules for the execution are and/or will be allocated to different or at least two different execution environments for the execution.

A data processing pipeline forms a further subject matter of one or more example embodiments of the present invention. The data processing pipeline is provided for example as a machine-readable file, machine-readable data packet or software. In particular, the data processing pipeline is provided as a computer program product and/or is stored on a storage medium. The data processing pipeline is designed for execution on a cloud computing system. The data processing pipeline is based on the method in accordance with one or more example embodiments of the present invention and/or is generated and/or obtained by the execution of the method in accordance with one or more example embodiments of the present invention. The data processing pipeline comprises a plurality of software modules for execution on the cloud computing system and the software modules are connected in a data technical manner and are built, arranged and/or connected in particular in accordance with a texture.

A method for executing a data processing pipeline on a cloud computing system, in particular on a computer and/or a computer network, forms a further subject matter of one or more example embodiments of the present invention. The method provides in particular the installation or the implementation of the data processing pipeline on the cloud computing system. The data processing pipeline is based in particular on the method in accordance with one or more example embodiments of the present invention and/or is produced and/or generated based on the method in accordance with one or more example embodiments of the present invention.

The cloud computing system comprises at least one execution environment, in particular at least two execution environments. Moreover, the cloud computing system comprises at least one module source, for example in the form of an app store. The cloud computing system moreover comprises a source for input data, also called input data source, in particular a source for additional data. The cloud computing system comprises a control module that can be designed in terms of hardware or software. It is particularly preferred that the control module is a software application. The method provides that a pipeline data set is received. For example, the pipeline data set is provided in the form of a machine-readable storage medium and/or as a file and/or data set. The pipeline data set comprises and/or is based on a data processing pipeline, wherein the data processing pipeline has been generated based on the method in accordance with one or more example embodiments of the present invention. In other words, the data processing pipeline is provided, in particular provided in a machine-readable manner. Based on the received data processing pipeline and/or the pipeline data set, the control module implements and/or installs the software modules that are included in the data processing pipeline on the cloud computing system. For example, the control module triggers and/or initiates the execution environments, cloud and/or the system elements so as to install the software modules that are provided in accordance with the data processing pipeline and/or pipeline data set for execution in the execution environments, for example to obtain and/or request the software modules from the module source. The software modules that are allocated and/or distributed in this manner are then executed or applied by the respective execution environment so as to execute and/or implement the data processing pipeline. This embodiment is based on the consideration that a control module orchestrates in a centralized manner the participants of the cloud computing system or participants in the execution of the data processing pipeline, for example deploys the respective software modules.

It is particularly preferred that in one method step data channels are generated. The data channels form data technical connections between at least two software modules, between an input data source and/or an output interface and an input interface of software modules. The control module is designed so as to generate and/or to build the data channels between the participants. The software module generates the data channels based on the pipeline data set, the architecture and/or the data processing pipeline. In particular, the control model is designed so as to generate the data channels based on a comparison of the data contract data of the data that is to be transmitted by the connection with the execution information data and/or the module requirement data. For example, based on the comparison it is determined that data from a facility or a system element is to be transmitted to a cloud, wherein the data that is to be transmitted has high data protection requirements in accordance with the data contract data and cannot be transmitted in an unencrypted and/or anonymized manner with the result that based on this comparison the control module builds a data technical connection that is encrypted and/or transmits anonymized data.

It is particularly preferred that the control module generates data channels between software modules, wherein the generation of the data channels or the type of the data channels is based on a comparison of the data that is to be transmitted or its data contract data with the module requirement data.

In particular, it is provided that the data channels between the software modules and/or the system elements and the cloud form secured and/or encrypted data channels. In other words, the control module is designed so as to generate and/or to build secured and/or encrypted data channels. A computer program for execution on a computer, in particular a cloud computing system, forms a further subject matter of one or more example embodiments of the present invention.

A computer program, in particular computer program product, forms a further subject matter of one or more example embodiments of the present invention. The computer program is designed in the case of its execution so as to implement and/or apply the method for generating and/or executing a data processing pipeline.

A system, in particular a cloud computing system, comprising at least one execution environment, an input data source and a control module forms a further subject matter of one or more example embodiments of the present invention. In particular, the cloud computing system is connected to a module source in a data technical manner. The cloud-computing system is designed and/or configured so as to apply and/or to implement the method for executing and/or applying the data processing pipeline in accordance with one or more example embodiments of the present invention.

FIG. 1 illustrates schematically an example of a cloud computing system 1. The cloud computing system 1 comprises a cloud 2 and a system element 3, wherein the system element a network and/or IT system of a hospital. The cloud 2 comprises a first execution environment 4a, wherein the system element 3 comprises a second execution environment 4b. The execution environments 4 are designed so as to execute at least one software module 5. The execution environments 4 comprise in each case execution environment information 6. The execution environment information 6 is designed as machine-readable and comprises a description of the associated execution environment 4, for example system resources, processor power, working memory, operating system, geo-location and/or data protection.

The software modules 5 can be obtained from a module source 7. The module source 7 is for example an app store. The cloud computing system 1 comprises a human machine interface 8. A user 9 can make and/or provide a software module selection via the human machine interface 8. The human machine interface 8 comprises preferably a display and/or a touch input unit, wherein the user 9 can display, filter and/or search for software modules 4 that can be provided by the module source 7. The user 9 selects at least one software module 5 that is to be used in the data processing pipeline 10 that is to be generated and/or planned. The software modules 5, in particular the software modules 4 that are included in the software module selection, comprise machine-readable module requirement data 11. The module requirement data 11 comprises a description of the technical requirements, the data protection that is ensured, characteristics, module inputs 12 and/or module outputs 13.

The cloud computing system 1 comprises a control module 14. The control module 14 is thus designed as a software application, for example is stored centrally on the cloud and/or is provided by a third party or module. The control module 14 is designed based on a provided data processing pipeline 1 and/or installation file so as to request and/or to obtain the required and/or the included software modules 5 from the module source 7. The control module 14 distributes the software modules 5 to the respective execution environments 4 and/or triggers the installation on the execution environments 5. In other words, the control module 14 is responsible for the deployment and/or the orchestration. Moreover, the control module 14 is designed so as to build, to configure and/or to define the data technical connections 15 between the execution environments 4, between the software modules 4 and/or between the input data and software modules 4 and/or between module outputs 13 and module inputs 12.

Input data 16a, b, c is provided by the system element 3. Moreover, input data 16d is provided from the cloud 2. The software modules 5 are designed so as to process, for example to evaluate and/or to edit data that is provided. The software modules 5 can provide the processed data and/or results that are based on the processing as output data, in particular as module output data. The input data 16, module output data and/or data that is generated in the data processing pipeline and/or meta data that is to be exchanged has allocated data contract data 17. The data contract data 17 is based on a data contract and/or comprises information regarding the data protection that is valid for the associated data.

Figure 2:
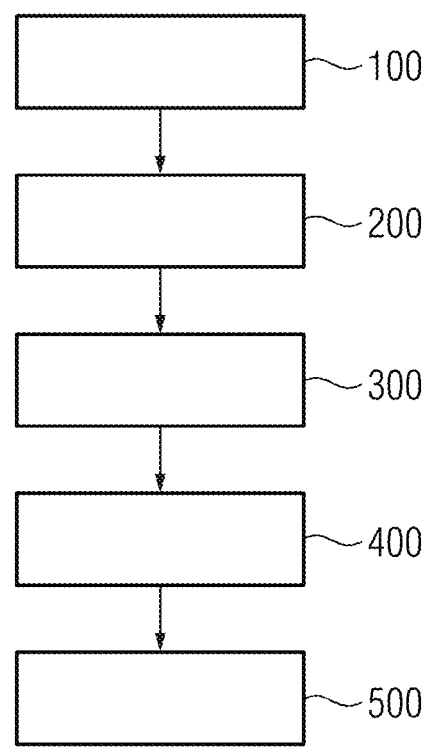
FIG. 2 shows a flow diagram of an exemplary data processing pipeline.

FIG. 2 illustrates a flowchart for an exemplary embodiment of a method for generating a data processing pipeline 1. In a step 100, at least one software module selection of a user 9 is received. The software module selection relates to the selection of software modules 5 for the data processing pipeline 1 that is to be generated. The software modules 5 in each case comprise allocated module requirement data 11.

In a step 200, at least one input data selection of a user 9 is received for the data processing pipeline 1 that is to be generated, wherein the input data selection comprises a selection of input data 16 for the data processing pipeline 1 that is to be generated, wherein the input data 16 has in each case allocated data contract data 17.

In a step 200, at least one user planning input is received, wherein the user planning input comprises a description of an architecture of the data processing pipeline 1 that is to be generated, a data technical connection 15 between the software modules 5 of the data processing pipeline 1 that is to be generated and/or a distribution of the selected software modules 5 to execution environments.

In a step 300, a compliance with data protection requirements and/or technical requirements of the data processing pipeline 1 that is to be generated is checked, wherein the check is based on the data contract data 17 of the selected input data 16, the module requirement data 11 of the selected software modules 5, the user planning input and/or the execution environment information data 6. Test information is determined based on the check.

In a step 400, the data processing pipeline 1 is generated based on the selected input data 16, the selected software modules 5 and the user planning input. In the step 500, the generated data processing pipeline 1 and/or the determined test information is provided.

Figure 3:
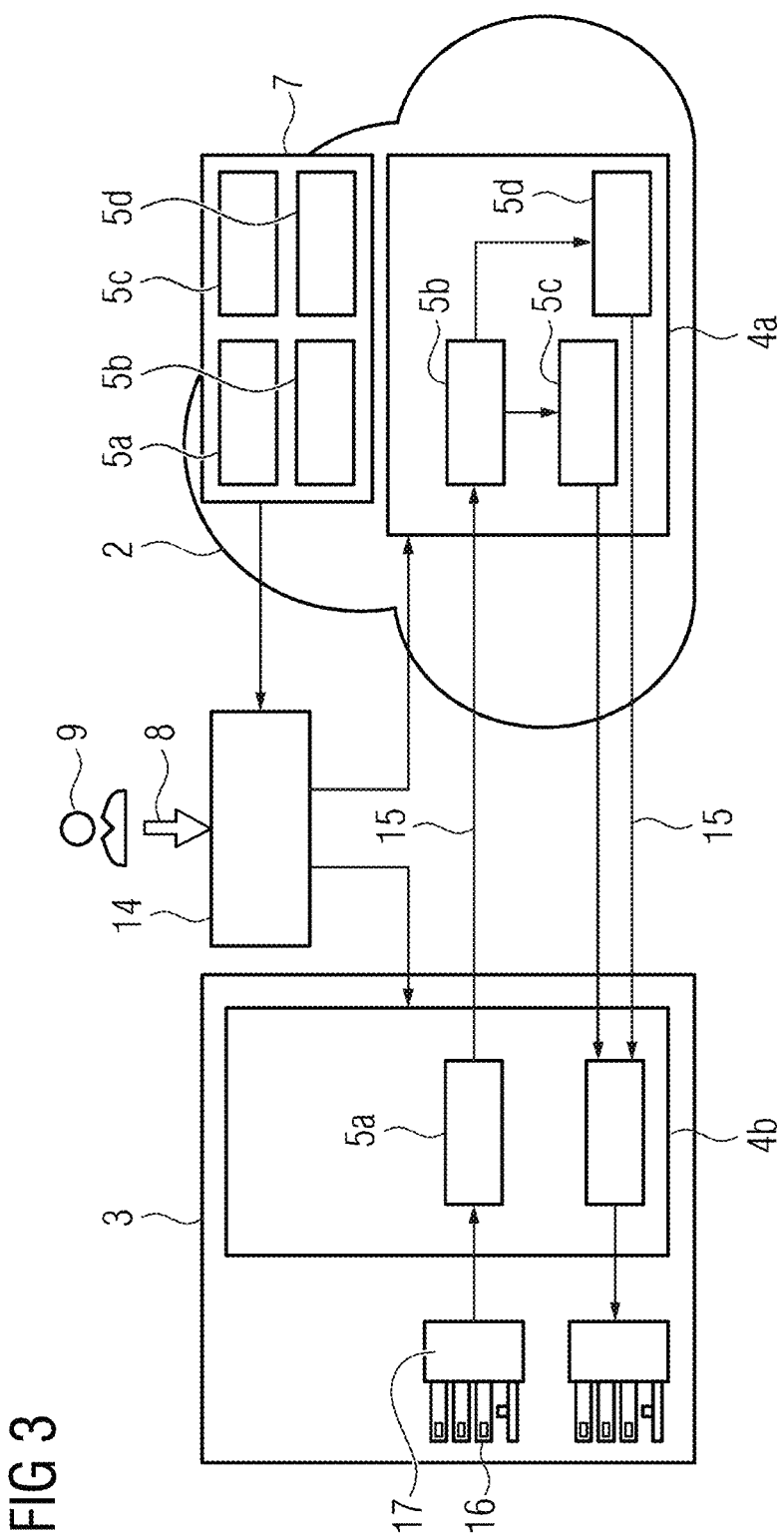
FIG. 3 shows an application example of a data processing pipeline cloud computing system for execution.

FIG. 3 illustrates an exemplary embodiment of a data processing pipeline 1. In this case, input data 16 comprising a pathology data set is to be. The pathology data set comprises patent information (start date), pathology record (iSyntax format), wherein these are admitted for pseudonymized disclosure released in accordance with the data contract. A software module 5a comprising a pseudonymization algorithm, a software module 5b for converting iSyntax format into TIFF format, a software module 5c for tumor segmentation (input in the TIFF format) and a software module 5d for classification of the MSI status (input in the TIFF format) can be obtained from the module source 7.

A user 9 with the aid of a human machine interface 8 creates a data processing pipeline that is to be generated. For this purpose, an input data selection is provided by the user 9 from the input data, a software module selection comprising the tumor segmentation and MSI classification and a user planning selection. The method provides that a check is made for compliance with the technical requirements and/or data protection requirements. Based on the check, it is determined that the data protection for the pathology data cannot be complied with and that not all the technical requirements can be complied with. Based on the check, as the software module 5a for pseudonymization and also the software module 5b is selected for conversion and the data processing pipeline 1 is generated. The central control module 14 installs the software modules 5a, 5b on the local execution environment 4b in the clinic—so as to fulfil the data contract—and the software modules 5c, 5d in the execution environment 4a or the cloud 2—so as to fulfil the technical requirements. Encrypted data channels 15 are created between the software modules 5 for the data exchange.

Figure 4:
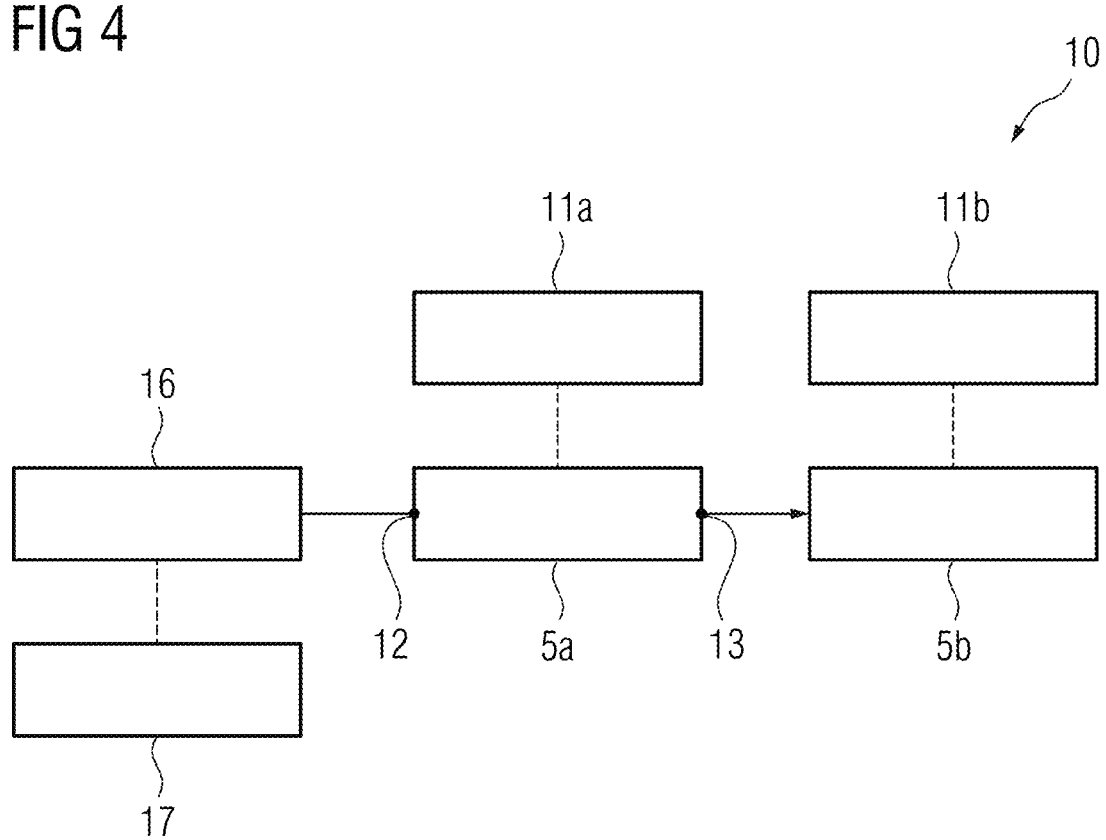
FIG. 4 shows interaction between software modules according to one or more example embodiments.

FIG. 4 illustrates an exemplary embodiment for an interaction of software modules 5a, 5b. The software modules 5a, b comprise in each case a module input 12 and a module output 13. The software modules 5a, b have in each case allocated module requirement data 11a, 11b. The input data 16 has allocated data contract data 17. The input data 16 is provided to the software module 5a. The module output data of the software module 5a is provided to the software module 5b at the module input.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The expression "a number of" means "at least one". The mention of a "unit" or a "device" does not preclude the use of more than one unit or device. The expression "a number of" has to be understood as "at least one".

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for generating a data processing pipeline for a cloud computing system, the data processing pipeline including at least one software module for execution in at least one execution environment, the execution environment having allocated execution environment information data, the method comprising:
   receiving, from a user, at least one software module selection for the data processing pipeline, the software module selection including at least one software module from a source of software modules, each software module having allocated module requirement data;
   receiving, from the user, at least one input data selection for the data processing pipeline, the input data selection including a selection of input data for the data processing pipeline the input data having allocated data contract data;
   receiving, from the user, at least one user planning input, the at least one user planning input including a description of at least one of
      an architecture of the data processing pipeline,
      a data technical connection between the selected at least one software module of the data processing pipeline that is to be generated, or
      a distribution of the selected at least on software module to execution environments;
   determining test information by checking at least one of a compliance with data protection requirements of the data processing pipeline or a compliance with technical requirements of the data processing pipeline based on at least one of
      the data contract data of the selected input data,
      the module requirement data of the selected at least one software module,
      the at least one user planning input, or
      execution environment information data; and
   providing the test information.

2. The method of claim 1, further comprising:
   generating the data processing pipeline based on the selected input data, the selected at least one software module and the at least one user planning input; and
   providing the generated data processing pipeline.

3. The method of claim 1, further comprising:
   determining, based on the test information, at least one of a possible software module or a required software module for fulfilment, in response to the checking resulting in non-compliance with at least one of the data protection requirements or the technical requirements; and
   providing a module proposal for integration into the data processing pipeline, the module proposal including at least one of the possible software module or the required software module.

4. The method of claim 1, further comprising:
   determining, based on the test information, at least one of a possible software module or a required software module for fulfilment, in response to the checking resulting in non-compliance with at least one of the data protection requirements or the technical requirements; and
   generating the data processing pipeline based on the selected input data, the selected at least one software module, the at least one user planning input, and the determined at least one possible software module or required software module.

5. The method of claim 1, wherein
   each software module of the at least software module includes at least one input interface for acquiring module input data and at least one output interface for acquiring module output data,
   at least one of the module input data or the module output data has allocated data contract data, and
   the checking checks whether the data protection requirements are fulfilled based on a comparison of at least one of the data contract data of the module output data or the data contract data of the module input data with at least one of
   module requirement data of further selected software modules,
   the at least one user planning input, or
   the execution environment information data.

6. The method of claim 3, further comprising:
   determining a software module having at least one of minimal data processing, minimal data minimization, minimal anonymization, or minimal pseudonymization of at least one of the input data or module input data as the at least one possible software module or required software module.

7. The method of claim 1, wherein the checking the at least one of the compliance with data protection requirements of the data processing pipeline or the technical requirements of the data processing pipeline checks a fulfilment of technical requirements of the selected at least one software module for at least one of
   an execution in the data processing pipeline,
   an execution in combination with further software modules, or
   an execution in the execution environment, based on at least one of a comparison of the module requirement data of the respective software module with the execution environment information data, the at least one user planning input, or the module requirement data of the further software modules.

8. The method of claim 1, wherein the checking the at least one of the compliance with data protection requirements of the data processing pipeline or the technical requirements of the data processing pipeline checks a fulfilment of the data protection requirements of the data processing pipeline based on a comparison of the data contract data of the selected input data with at least one of the module requirement data of the selected at least one software module, the at least one user planning input, or the execution environment information data.

9. The method of claim 2, wherein the generating the data processing pipeline generates a hybrid data processing pipeline, wherein the hybrid data processing pipeline comprises at least one of a distribution, an allocation, or an execution of the selected at least one software module on at least two execution environments.

10. A data processing pipeline for execution on a cloud computing system, wherein the data processing pipeline has been obtained using the method of claim 1.

11. A method for executing a data processing pipeline on a cloud computing system, wherein the cloud computing system has at least one execution environment, at least one module source, at least one input data source and a control module, the method comprising:
receiving a pipeline data set, wherein the pipeline data set includes a data processing pipeline that is generated according to the method of claim 1;
deploying, by the control module, software modules included in the data processing pipeline by at least one of distributing the software modules to the at least one execution environment or allocating the software modules to the at least one execution environment; and
executing the software modules by the at least one execution environment.

12. The method of claim 11, further comprising:
generating data channels at least one of between the software modules of the data processing pipeline or between the execution environments by the control module, based on a comparison of the execution environment information data with at least one of the data contract data of the input data, module input data, or module output data.

13. The method of claim 12, wherein the generating the data channels generates at least one of secured or encrypted data channels.

14. A non-transitory computer-readable medium including instructions which, when executed by at least one of a computer or a cloud computing system, cause the at least one computer or cloud computing system to perform the method of claim 1.

15. A cloud computing system comprising at least one execution environment, an input data source, and a control module, wherein the cloud computing system is configured perform the method of claim 1.

16. The method of claim 2, further comprising:
determining at least one of a possible software module or a required software module for fulfilment based on the test information in an event of non-compliance with at least one of the data protection requirements or the technical requirements,
wherein the generating the data processing pipeline generates the data processing pipeline based on the selected input data, the selected at least one software module, the at least one user planning input, and at least one of the possible software module or the required software module.

17. The method of claim 16, wherein
each software module of the at least one possible or required software module includes at least one input interface for acquiring module output data and at least one output interface acquiring module output data,
at least one of the module input data or the module output data has allocated data contract data, and
the checking checks whether the data protection requirements are fulfilled based on a comparison of at least one of the data contract data of the module output data or the data contract data of the module input data with at least one of
module requirement data of further selected software modules,
the at least one user planning input, or
the execution environment information data.

18. The method of claim 2, wherein the checking the at least one of the compliance with data protection requirements of the data processing pipeline or the technical requirements of the data processing pipeline checks a fulfilment of technical requirements of the selected at least one software module for at least one of
an execution in the data processing pipeline,
an execution in combination with the further software modules, or
an execution in the execution environment,
based on at least one of a comparison of the module requirement data of the respective software module with the execution environment information data, the user planning input or the module requirement data of the further software modules.

19. The method of claim 18, wherein the checking the at least one of the compliance with data protection requirements of the data processing pipeline or the technical requirements of the data processing pipeline checks a fulfilment of the data protection requirements of the data processing pipeline based on a comparison of the data contract data of the selected input data with at least one of the module requirement data of the selected at least one software module, the at least one user planning input, or the execution environment information data.

20. The method of claim 19, wherein the generating the data processing pipeline generates a hybrid data processing pipeline, wherein the hybrid data processing pipeline comprises at least one of a distribution, an allocation, or an execution of the selected at least one software module on at least two execution environments.

21. The method of claim 1, further comprising:
generating the data processing pipeline based on the selected input data, the selected at least one software module and the at least one user planning input in response to the test information indicating compliance with the data protection requirements and the technical requirements;
providing the data processing pipeline in response to generating the data processing pipeline; and
providing the test information in response to the test information indicating non-compliance with at least one of the data protection requirements or the technical requirements.

* * * * *